United States Patent
Ghoshal et al.

(10) Patent No.: US 11,916,761 B1
(45) Date of Patent: Feb. 27, 2024

(54) SYSTEMS AND METHODS FOR DYNAMICALLY DELIVERING VALUE-ADDED SERVICES

(71) Applicant: T-Mobile Innovations LLC, Overland Park, KS (US)

(72) Inventors: Jagannath Ghoshal, Olathe, KS (US); Brett Talcott, Olathe, KS (US); Misty Dombrowski, Pleasant Hill, MO (US)

(73) Assignee: T-Mobile Innovations LLC, Overland Park, KS (US)

( * ) Notice: Subject to any disclaimer, the term of this patent is extended or adjusted under 35 U.S.C. 154(b) by 169 days.

(21) Appl. No.: 17/458,057

(22) Filed: Aug. 26, 2021

(51) Int. Cl.
*H04L 41/5041* (2022.01)
*H04W 8/18* (2009.01)

(52) U.S. Cl.
CPC ........... *H04L 41/5041* (2013.01); *H04W 8/18* (2013.01)

(58) Field of Classification Search
CPC .............................. H04L 41/5041; H04W 8/18
See application file for complete search history.

(56) References Cited

U.S. PATENT DOCUMENTS

| 2008/0209052 A1* | 8/2008 | Velan | H04L 67/306 709/228 |
| 2015/0118999 A1* | 4/2015 | Merchant | H04M 15/43 455/414.1 |
| 2015/0319211 A1* | 11/2015 | Edelman | H04L 47/10 709/219 |
| 2018/0227434 A1* | 8/2018 | Zhang | H04M 15/66 |
| 2021/0212134 A1* | 7/2021 | Sternberg | H04W 72/51 |

FOREIGN PATENT DOCUMENTS

WO  WO-2016151467 A1 * 9/2016 ............. G06Q 30/02

* cited by examiner

*Primary Examiner* — Nicholas R Taylor
*Assistant Examiner* — Sanjoy Roy

(57) ABSTRACT

A method for providing communication services as VASs to subscribers of a communication service provider based on building a subscriber relationship data structure in a data store. The method includes building the subscriber relationship data structure such that it comprises a first layer which comprises a first VAS node corresponding to a first VAS and a second layer comprising one or more service group nodes and corresponding service groups. The method additionally includes receiving a first request from a first subscriber and from a second. The method further includes modifying the subscriber relationship data structure such that the one or more service group nodes comprises a first service group node in which the first subscriber and the second subscriber are each identified as belonging to a corresponding first service group of the one or more service groups, and deploying the first VAS to the first and second subscribers.

20 Claims, 8 Drawing Sheets

SYSTEMS AND METHODS FOR DYNAMICALLY DELIVERING VALUE-ADDED SERVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Value-added services (VASs) are communication services deliverable to network-enabled devices beyond standard core services included within a communication service provider's standard service offering such as voice calls that are offered to every subscriber having an account with a given service provider. VASs may incentivize subscribers to engage more often with their network-enabled devices and thereby increase the revenue received by the service provider from a given user. VASs may originate from third party content producers or from the service provider itself. For example, VASs may include subscription-based content delivery services such as, for example, Netflix® by Netflix, Inc. (hereinafter, "Netflix") and/or Hulu® by Hulu, Inc. (hereinafter, "Hulu"), which allow subscribers to stream video and/or other premium content onto their network-enabled device. VASs may also include, for example, premium text and/or multimedia messaging services, as well as premium quality of service (QoS) services such as greater bandwidth, extended network storage, etc.

SUMMARY

In an embodiment, a system for providing communication services as VASs to subscribers of a communication service provider based on building a subscriber relationship data structure in a data store and referencing the data store to determine service groups of subscribers to deploy the VASs is disclosed. The system includes a processor, a non-transitory memory, and one or more applications stored in the non-transitory memory that, when executed by the processor build the subscriber relationship data structure in the data store by a subscriber relationship engine of a network managed by the communication service provider, wherein the subscriber relationship engine comprises one of the one or more applications executable by the processor and the subscriber relationship data structure comprises a first layer which comprises a first VAS node corresponding to a first VAS offered by the network and a second layer comprising one or more service group nodes connected to the first VAS node and corresponding to one or more service groups. Additionally, the one or more applications, when executed by the processor receive a first request by the subscriber relationship engine for the first VAS offered by the communication service provider jointly from a first subscriber of the communication service provider belonging to a first subscription account and from a second subscriber of the communication service provider belonging to a second subscription account that is distinct from the first subscription account, and modify the subscriber relationship data structure by the subscriber relationship engine such that the one or more service group nodes comprises a first service group node in which the first subscriber and the second subscriber are each identified as belonging to a corresponding first service group of the one or more service groups. Further, the one or more applications, when executed by the processor deploy the first VAS by a VAS provisioning engine of the network to a first user equipment associated with the first subscriber and a second UE associated with the second subscriber.

In an additional embodiment, another system for providing communication services as VASs to subscribers of a communication service provider based on building a subscriber relationship data structure in a data store and referencing the data store to determine service groups of subscribers to deploy the VASs. The system includes a processor, a non-transitory memory, and one or more applications stored in the non-transitory memory that, when executed by the processor construct the subscriber relationship data structure in the data store by a subscriber relationship engine of a network managed by the communication service provider and comprising a first layer, wherein the subscriber relationship engine comprises one of the one or more applications executable by the processor and the relationship data structure comprises a first layer which comprises a first VAS node corresponding to a first VAS offered by the network and a second layer comprising one or more service group nodes connected to the first VAS node and corresponding to one or more service groups. Additionally, the one or more applications, when executed by the processor, receive a first request by the subscriber relationship engine for a first VAS offered by the communication service provider jointly from a first subscriber of the communication service provider and from a second subscriber of the communication service provider, and modify the subscriber relationship data structure by the subscriber relationship engine such that the one or more service group nodes comprises a first service group node in which the first subscriber and the second subscriber are each identified as belonging to a corresponding first service group of the one or more service groups. Further, the one or more applications, when executed by the processor, present a first offer for the first VAS by an offer presenter of the network to the first subscriber and the second subscriber in response to receiving the first request, wherein the first offer is based on a service depth corresponding to the total number of subscribers comprising the first service group associated with the VAS, and deploy the VAS by a VAS provisioning engine of the network to a first user equipment associated with the first subscriber and a second UE associated with the second subscriber in response to both the first subscriber and the second subscriber jointly accepting the first offer presented by the offer presenter.

In a further embodiment, a method for providing communication services as VASs to subscribers of a communication service provider based on building a subscriber relationship data structure in a data store and referencing the data store to determine service groups of subscribers to deploy the VASs is disclosed. The method includes building the subscriber relationship data structure in the data store by a subscriber relationship engine executing on a computer system, wherein the subscriber relationship data structure comprises a first layer which comprises a first VAS node corresponding to a first VAS offered by the network and a second layer comprising one or more service group nodes connected to the first VAS node and corresponding to one or more service groups. The method additionally includes receiving a first request by the subscriber relationship engine for a first VAS offered by the communication service provider jointly from a first subscriber of the communication service provider belonging to a first subscription account and from a second subscriber of the communication service provider belonging to a second subscription account that is distinct from the first subscription account. The method further includes modifying the subscriber relationship data structure by the subscriber relationship engine such that the one or more service group nodes comprises a first service group node in which the first subscriber and the second subscriber are each identified as belonging to a corresponding first service group of the one or more service groups, and deploying the first VAS by a VAS provisioning engine executing on the computer system to a first user equipment associated with the first subscriber and a second UE associated with the second subscriber.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
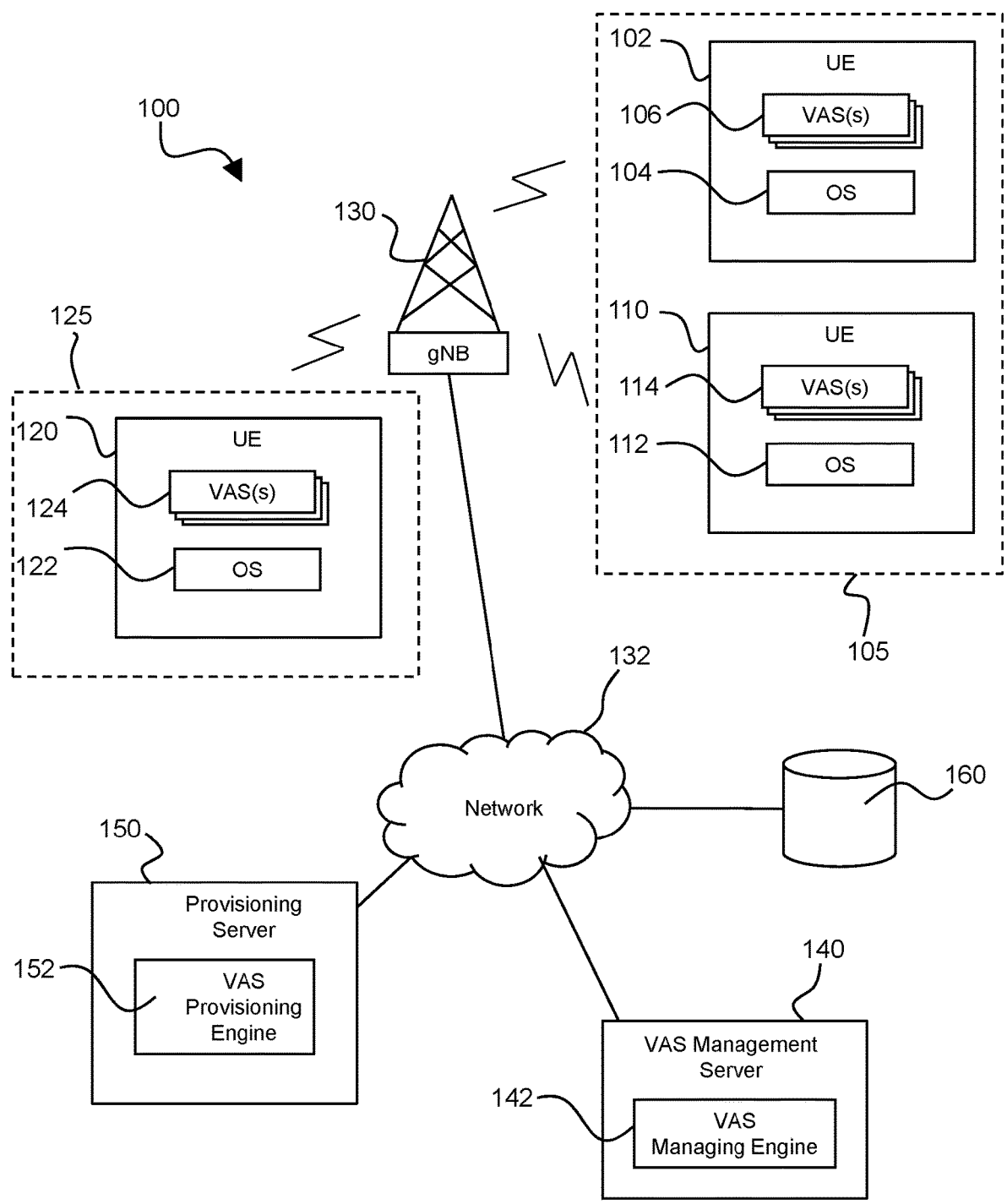
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, VASs are communication services beyond the standard core services included within a communication service provider's standard service offering and which may include, for example, content delivery services, premium text and/or multimedia messaging services, and/or premium QoS services. VASs may be offered to users as a service subscription bundle by the service provider. For example, one or more VASs may be bundled with the service provider's core services forming the service provider's standard service offering.

Conventionally, service bundles including a service provider's standard service offering and one or more VASs are coarsely grained and fixed for an extended period of time. For example, a user when shopping subscription bundles offered by a service provider may only select between a limited number of fixed options each having a fixed duration that may extend for one or several years. A first service bundle offered through the service provider may include a content delivery service such as Netflix which the user is interested in receiving but lack a premium QoS feature such as extended bandwidth. A second service bundle offered through the service provider may include the desired premium QoS feature but may lack the desired content delivery service and so on and so forth.

Akin to dining at a restaurant offering a fixed and limited menu lacking alterations, substitutions, and a la carte options, the user may not tailor either the duration of each of the offered subscription bundles or which VASs are offered with a given subscription bundle. Instead, the user must "take it or leave it" with respect to the limited and fixed subscription bundles offered through the service provider and thus may, if still interested, be forced to select a subscription bundle that either has VASs the user is not interested in or lacks VASs which the user desires. The user may thus be forced to either go without desired VASs or, in some cases, subscribe directly to a third-party content producer at a price that is above what the service provider is capable of offering for the particular VAS. In either case, the user may not utilize his or her network-enabled devices to the same degree he or she would have had the user had the opportunity to tailor the user's subscription to include those and only those VASs the user desires at a given point in time.

Additionally, as described above, conventional subscription bundles offered by service providers typically extend for lengthy fixed periods of time. Thus, even when a user is able to find a subscription bundle including the VASs to which the user is interested, the user may be unable to alter the VAS over the duration of the subscription as the user's needs and interests change over time. The user instead may be stuck with VASs which the user no longer needs and be unable to add other VASs to the user's subscription bundle which the user now desires.

Further, with conventional subscription bundles each user of a plurality of users belonging to a single subscription account may only access VASs included in a subscription bundle corresponding to the given subscription account. As an example, a subscription account may be shared between a husband, a wife, and the couple's two teenage children. Although the needs and interests of each person assigned to the subscription account may vary, the husband, wife, and children may only access the particular VASs included in the subscription bundle corresponding to the subscription account. Each person does not have the option to add VASs to only their network-enabled device in order to tailor the subscription account to their specific interests. Instead, the VASs accessible by the first child, for example, must be shared between each person assigned to the subscription account so on and so forth.

In an embodiment, systems and methods for operating a relationship data structure relating VASs to subscribers of a communication service provider are provided. Additionally, one or more the VASs identified in the subscriber relationship data structure may be delivered to the one or more subscribers of a given service group identified by the subscriber relationship structure in response to the one or more subscribers specifically requesting the one or more VASs. In some embodiments, the request for the one or more VASs and the subsequent delivery of the one or more VASs may be made any time following the initiation of a subscription account to which the subscriber belongs. Thus, in at least some embodiments, the subscriber may flexibly add particular VASs at any time in response to changing needs or desires of the user. The subscriber need not be limited to selecting a fixed menu of VASs corresponding to a given subscription bundle. Instead, particular VASs desired by the subscriber of the network may be delivered to the subscriber at a time of the subscriber's choosing. In this manner, the subscriber may tailor his or her subscription account to include those and only those VASs which the subscriber desires at a given point in time.

In addition to the ability of selecting a given VAS at the subscriber's choosing, the subscriber may also have the freedom in embodiments disclosed herein to enter into relationships with subscribers of separate accounts by jointly requesting a given VAS offered through the communication service provider which manages the network. For instance, a first subscriber of a first subscription account may jointly request a first VAS with a second subscriber belonging to a second subscription account, thereby forming a first service group associated with the first VAS and comprising the first and second subscribers, where the subscriber relationship data structure comprises the first service group at one of the layers thereof. By forming service groups with other subscribers, including subscribers belonging to other subscription accounts, subscribers may obtain an offer at a reduced price for the requested VAS from the service provider so as to reflect the added leverage of a request made jointly by several subscribers belonging to separate subscription accounts. In some embodiments, the service provider may offer a reduced price to a service group comprising a multiple subscribers belonging to separate subscription accounts to incentivize subscribers to form service groups associated with a VAS as an effort to drive demand for the VAS (through subscribers referring other, previously unrelated subscribers belonging to different subscription accounts to the VAS) across the subscription account base of the service provider so that the service provider may obtain a lower wholesale price for the VAS from the original producer of the content comprising the VAS.

In embodiments disclosed herein, subscribers may also have the option of requesting access to a VAS for one and only one subscriber belonging to a multi-subscriber subscription account. For instance, a first subscription account may comprise first and second subscribers. In some embodiments, the first subscriber may request access to a first VAS which is then delivered to only the first subscriber while access to the first VAS remains restricted for the second subscriber. The first subscriber may be identified by the subscriber relationship data structure as belonging to a first service group associated with the first VAS. Additionally, the subscriber relationship data structure may identify the second subscriber as not being a member of the first service group. In this manner, individual subscribers of a multi-subscriber subscription account may create their own unique subscription bundles within the account. In some embodiments, a price of an offer of a VAS to only one subscriber of a multi-subscription account may be reduced to reflect that the other subscribers belonging to the subscription account are not receiving access to the given VAS.

As an example, a first subscription account may include a first husband, a first wife, and a first child. Additionally, a second subscription account may include a second husband, a second wife, and a second child. Further, a third subscription account may include a third husband, a third wife, and a third child. In this example, the first husband and the second husband may wish to jointly access a first video streaming VAS such as Hulu. Additionally, the first wife and the third wife may wish to jointly access a different video streaming VAS such as Netflix which includes content that differs from the first video streaming VAS. Further, the second child and the third child may wish to jointly access a VAS comprising a gaming service. In conventional systems, there would be no way for the subscribers of the aforementioned subscription accounts to gain leverage across the different subscription accounts. For instance, in a conventional system a given subscription bundle could include Hulu or not include Hulu. Instead, in embodiments disclosed herein subscribers belonging to separate subscription accounts may define their own relationships (e.g., by jointly accessing a given VAS) and leverage that relationship to jointly access VASs across account boundaries and gain the advantage of group pricing by forming different service groups identified by the subscriber relationship structure. Thus, the subscribers themselves may define or create their own service bundles by requesting the VASs of their own choosing rather than needing to select from a limited number of subscription bundles having different, fixed menus of VASs.

Further, as described above, the delivery of a VAS requested jointly by subscribers belonging to separate subscription accounts may be restricted to only those subscribers of the subscription accounts which jointly requested the given VAS, and the VAS may not be delivered to the other subscribers belonging to those same subscription accounts. Thus, if the first husband and second husband jointly request a VAS comprising Hulu, a bundled price advantage may be provided—but Hulu may be delivered only to the first husband and the second husband such that the first wife, the first child, the second wife, and the second child are each restricted from accessing Hulu at least via an offer provided by the service provider given that they do not belong to the same service group identified by the subscriber relationship data structure as including the first and second husbands. Likewise, the first wife and the third wife might receive Netflix through the service provider, but the first husband, the first child, the third husband, and the third child may be restricted from accessing Netflix at least via an offer provided by the service provider.

The embodiments described herein are a specific technical solution to a specific technical problem. The technical problem includes, for example, (1) the inability of a subscriber of a service provider to tailor his or her access to VASs provided by the service provider to reflect the needs or wants of the subscriber at a given time, and (2) the inability of a subscriber of a service provider to form relationships with subscribers belonging to different subscription accounts so that the subscriber may obtain access to reduced, group pricing with respect to a given VAS. Embodiments disclosed herein address these challenges through a subscriber relationship engine configured to construct a subscriber relationship data structure which defines relationships between subscribers belonging to separate subscription accounts by their jointly requesting and receiving access to a given VAS offered through the service provider. The subscriber relationship data structure may be constructed by a subscriber relationship engine of a network managed by the communication service provider. The subscriber relationship data structure may comprise a plurality of layers including a first layer identifying different VASs offered by the network and a second layer identifying different service groups associated with a given VAS, where each service group comprises one or more subscribers of the network. The service groups of the subscriber relationship data structure allow subscribers of different subscription accounts to link together via the formation of service groups identified by the subscriber relationship data structure and having a specified service depth associated with the total number of subscribers belonging to the particular service group. In some embodiments, the subscriber relationship data structure may comprise a binary tree in which service groups comprising a plurality of service provider subscribers branch from a given VAS offered by the service provider.

Embodiments disclosed herein also address these challenges by presenting an offer to subscribers of the service provider by an offer presenter of the network managed by the service provider wherein the offer is generated by an offer generator of the network and is based on the service depth corresponding to the total number of subscribers comprising a first service group associated with the VAS. Given that each service group is not restricted to including only the subscribers of a single subscription account, the service depth of a given subscription account may be maximized by subscribers of different subscription accounts joining together within a single service group. Embodiments disclosed herein also address these challenges by deploying the VAS by a VAS provisioning engine of the network to subscribers which jointly requested the VAS upon those subscribers jointly accepting the offer presented by the offer presenter of the network.

Turning to FIG. 1, a communication system 100 is described. In an embodiment, the communication system 100 generally includes a first electronic device (user equipment—UE) 102, a second electronic device (UE) 110, a third electronic device (UE) 120, an access node 130, a network 132, a VAS management server 140, a provisioning server 150, and a data store 160. Each UE 102, 110, and 120 may comprise, for example, a desktop computer, a workstation, a laptop computer, a tablet computer, a smartphone, a wearable computer, an internet of things (IoT) device, and/or a notebook computer. UEs 102, 110, and 120 may each be operated by a separate user or customer of the network 132.

The access node 130 of communication system 100 may provide communication coupling UEs 102, 110, and 120 to the network 132 according to a 5G protocol, for example 5G, 5G New Radio, or 5G LTE radio communication protocols. The access node 130 may provide communication coupling UEs 102, 110, and 120 to the network 130 according to a long term evolution (LTE), a code division multiple access (CDMA), and/or a global system for mobile communication (GSM) radio communication protocol. The access node 130 may be referred to for some contexts as a gigabit Node B (gNB), an enhanced Node B (eNB), a cell site, or a cell tower. Additionally, while not shown, at least some of UEs 102, 110, and 120 may be communicatively coupled to the network 132 via a WiFi access point or another non-cellular radio device. Further, while a single access node 130 is illustrated in FIG. 1, it is understood that communication system 100 may comprise any number of access nodes 130.

The network 132 of communication system 100 may comprise one or more public networks, one or more private networks, or a combination thereof. For example, network 132 may comprise a 5G core network. Further details of 5G networks are discussed below with reference to FIGS. 7A, 7B. While shown as communicatively coupled to the network 132, servers 140, 150 and data store 160 may be considered part of network 132 and are illustrated as separate from network 132 in FIG. 1 to promote discussing their roles with respect to UEs 102, 110, and 120, as will be discussed further herein.

UEs 102, 110, and 120 may each include one or more applications VASs 106, 114, and 124, respectively, executable on an operating system (OS) 104, 112, and 122, respectively of the UE 102, 110, and 120. VASs 106, 114, and 124 of UEs 102, 110, and 120, respectively, may be selectably delivered to UEs 102, 110, and 120 as will be discussed further herein. Each of UEs 102, 110, and 120 may avail itself of the functionality provided by network 132 in accordance with a subscription account which establishes a relationship between network 132 and subscribers associated with UEs 102, 110, and 120. A given subscription account may comprise one or more subscribers and UEs.

In an example, UEs 102, 110 are associated with a first subscription account 105 while UE 120 may be associated with a second subscription account 125. First subscription account 105 may define at least some of the features and functionalities of network 132 which may be delivered to the UEs 102, 110 associated with first subscription account 105. Similarly, second subscription account 125 may define at least some of the features and functionalities of network 132 which may be delivered to the UE 120 associated with second subscription account 125. An administrator of network 132 may bill an account holder associated with first subscription account 105 for services rendered to UE 102, 110 and in accordance with terms and conditions of first subscription account 105. Similarly, the administrator of network 132 may bill an account holder associated with second subscription account 125 for services rendered to UE 120 and in accordance with terms and conditions of first subscription account 105. While only two subscription accounts 105, 125 are shown in FIG. 1, it may be understood that a large number of subscription accounts, each having one or more subscribers and UEs, may be associated with network 132.

As described above, a given subscription account may comprise one or more subscribers and UEs. As an example, first subscription account 105 may include a first subscriber associated with UE 102 and a second subscriber associated with UE 110 (e.g. a married couple owning a pair of smart phones 102, 110) where one of the first and second subscribers comprises a primary account holder responsible for paying any charges from the service provider associated with the first subscription account 105. The first and second subscribers are linked and placed into a relationship through belonging to the same first subscription account 105.

The first subscriber of first subscription account 105 may access VASs 106 delivered to UE 102 by network 132 while the second subscriber of first subscription account may access VASs 114 delivered to UE 110 by network 132. Although the first and second subscribers each belong to the same first subscription account 105, the VASs 106 delivered to UE 102 may vary from the VASs 114 delivered to UE 110. In other words, unlike conventional systems in which each subscriber belonging to a given subscription account must share the same one or more VASs associated with the subscription account, communication system 100 is configured to individually tailor the VASs 106, 114 delivered to UEs 102, 110 based on the preferences of each individual subscriber belonging to the first subscription account 105.

In this example, second subscription account 125 comprises a single subscriber associated with a single UE 120. The VASs 124 delivered to UE 120 may vary from the VASs 106, 114 delivered to UE 102, 110, respectively. A relationship may be established between UE 120 of second subscription account 125 with one or both of the first and second subscribers of the first subscription account 125 based on a service group established between the subscriber of second subscription account 125 and the one or both of the first and second subscribers of the first subscription account 125. As an example, the first subscriber of first subscription account 105 may jointly request a particular VAS with the subscriber of second subscription account 125 so as to establish a service group associated with the particular VAS between the first subscriber of the first subscription account 105 and the subscriber of second subscription account 125. As will be discussed further herein, by jointly requesting a VAS with other subscribers so as to form service groups with subscribers of other subscription accounts, subscribers may receive the requested VAS at a relatively lower price by increasing demand for the requested VAS among the subscriber base of the service provider. Additionally, while in this example first subscription account 105 includes two separate subscribers associated with UE 102, 110, respectively, and second subscription account 125 includes a single subscriber associated with UE 120, it may be understood the number of subscribers and UEs belonging to a given subscription account may vary significantly.

The VAS management server 140 of communication system 100 comprises a VAS managing engine 142 which is configured to determine which subscribers of network 132 may receive which VASs of a VAS product catalog associated with network 132. This determination by VAS managing engine 142 may be based on information contained in each subscription account which may be dynamically modified by the one or more subscribers belonging to the account at any point following the initiation of the subscription account up until the expiration of the subscription account. This determination by VAS managing engine 142 may also be based on information contained in subscriber profiles associated with the subscribers of network 132.

The VAS managing engine 142 of VAS management server 140 may also determine and present offers of VASs to subscribers of network 132. In at least some instances, the VAS managing engine 142 may determine and present an offer of a VAS to one or more subscribers of network 132 in response to the one or more subscribers requesting the particular VAS. The one or more subscribers may belong to the same subscription account or may belong to a plurality of subscription accounts making the request jointly so as to form a service group associated with the particular VAS. The offer determined by the VAS managing engine 142 may be based on the number of subscribers comprising the service group which is jointly requesting the particular VAS.

Provisioning server 150 of communication system 100 comprises a VAS provisioning engine 152 configured to deliver VASs to authorized subscribers based on instructions provided by the VAS managing engine 142 of VAS management server 140. For example, upon one or more subscribers accepting an offer of one or more VASs provided by the VAS managing engine 142 of VAS management server 140, VAS provisioning engine 152 may deliver the one or more requested VASs to the UEs associated with the one or more subscribers. The identity of UEs associated with the one or more subscribers now authorized to receive the one or more requested VASs may be included in subscriber profiles stored in the data store 160 of network 132. Application instructions or other code that need be delivered to the one or more subscribers so they may access the requested VASs may also be stored in data store 160 or another data store of network 132 and retrieved by the VAS provisioning engine 152 for delivery to the one or more authorized subscribers.

Figure 2:
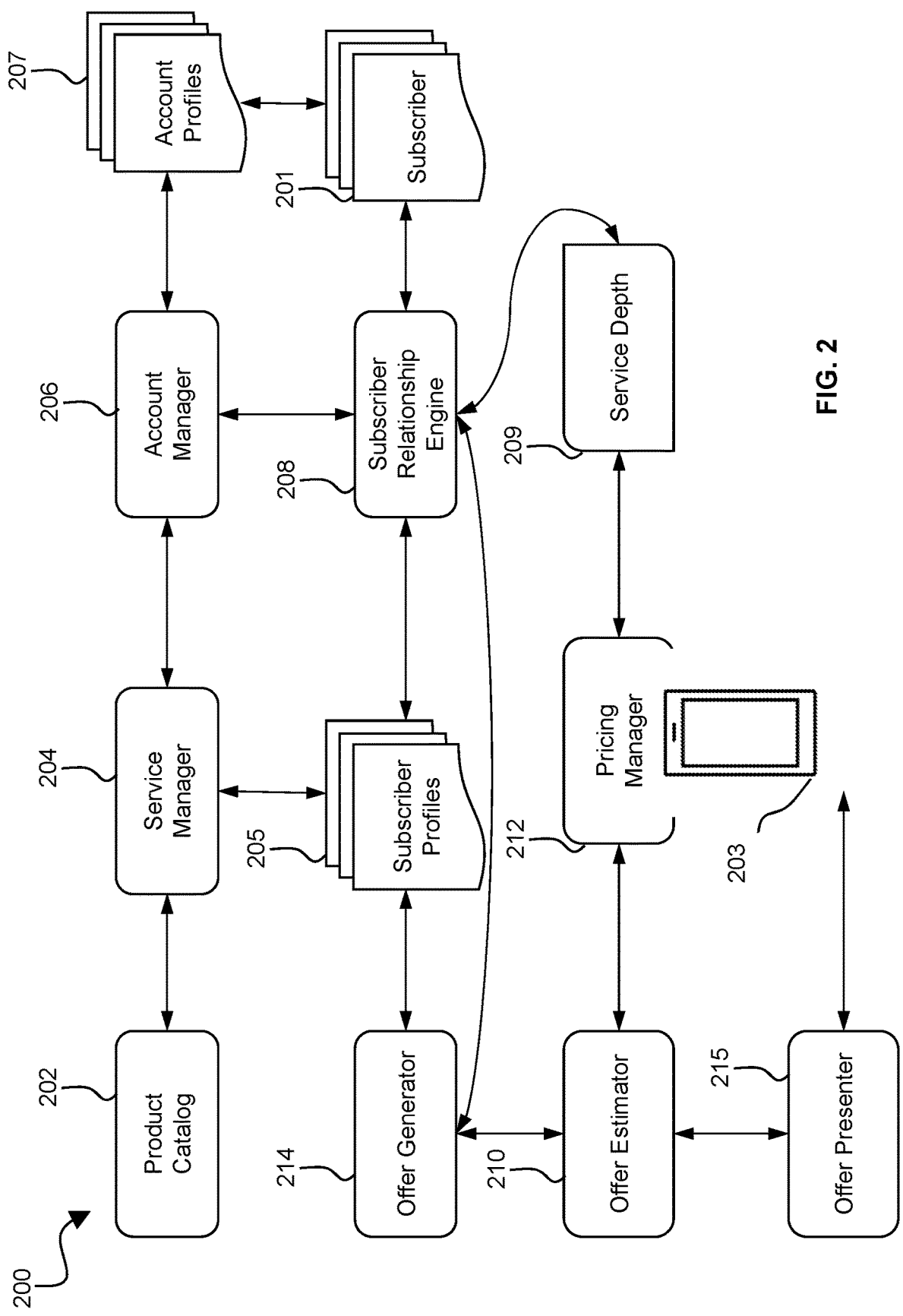
FIG. 2 is a flow chart of a system for dynamically delivering VASs offered by a network to a subscriber of the network according to an embodiment of the disclosure.

Referring to FIGS. 1, 2, a system 200 for determining and providing an offer of VASs to subscribers 201 of a network (e.g., network 132 of the communication system 100) is shown in FIG. 2. System 200 may be implemented via components of the communication system 100 and for convenience continuing reference is made to communication system 100 when discussing the features of system 200. However, it may be understood that system 200 may be implemented via communication systems other than communication system 100.

System 200 includes a product catalog 202, a service manager 204, an account manager 206, a subscriber relationship engine 208, an offer estimator 210, a pricing manager 212, and an offer generator 214. Product catalog 202 of system 200 contains a listing or index of each of the VASs offered by a communication service provider iva the network 132 managed by the communication service provider and may be stored in a data store of network 132 such as data store 160. As described above, the VASs indexed in product catalog 202 are services offered by the service provider via network 132 to subscribers 201 thereof in addition to the standard core services offered by the service provider to every subscriber 201 and may include, for example, content (e.g., streaming video, video games, etc.) delivery services, premium text and/or multimedia messaging services, and premium QoS services such as greater bandwidth, reduced latency, extended network storage, etc. Product catalog 202 may contain or may link to information, such as application information or code, corresponding to the VASs indexed in product catalog 202 and which may be delivered to a subscriber's UE (e.g., UE 102, 110, 120, etc.) by provisioning server 150 following authorization by VAS management server 140.

The service manager 204 of system 200 may access, retrieve, and/or edit information contained in a subscriber profile index 205 and may interface with the account manager 206 of system 200. In some embodiments, service manager 204 and account manager 206 may each be components of the VAS managing engine 142 of VAS management server 140. The subscriber profile index 205 contains subscriber information pertaining to the subscribers 201 of the service provider such as, for example, an identity and demographic information of each subscriber 201, the one or more UEs associated with each subscriber 201, information regarding the VASs each subscriber 201 is authorized to access, information regarding the extent or duration to which particular VASs have been used by each subscriber 201, as well as other information specific to the subscribers 201 of the service provider. Subscriber profile index 205 may be stored in a data store of network 132 such as data store 160. Service manager 204 may edit the information contained in subscriber profile index 205 to reflect changes to said information so the information contained in subscriber profile index 205 may remain as current and accurate as possible.

The account manager 206 of system 200 may similarly access, retrieve, and/or edit information contained in an account profile index 207. The account profile index 207 may contain information pertaining to the subscription accounts associated with network 132. For example, account profile index 207 may include information describing how many subscribers 201 belong to each subscription account as well as the identity of the subscribers 201 belonging to each subscription account. The account profile index 207 may also include billing information associated with each subscription account, the identity of the primary account holder for each subscription account, and pricing information pertaining to VASs currently being offered to subscribers 201 of each account. Account profile index 207 may be stored in a data store of network 132 such as data store 160. Account manager 206 may also edit the information contained in account profile index 207 to reflect changes to said information. Account manager 206 may also interface with the subscriber relationship engine 208 of system 200 which, in some embodiments, may comprise a component of the VAS managing engine 142 of VAS management server 140.

The subscriber relationship engine 208 of system 200 may, in some embodiments, comprise a component of the VAS managing engine 142 of VAS management server 140 and may retrieve and maintain information pertaining to the number of subscribers 201 which are authorized to access each VAS included in product catalog 202. Subscriber relationship engine 208 may also contain information identifying the service depth 209 of each subscriber 201 with respect to a given VAS, where the service depth 209 of a given subscriber with respect to a given VAS refers to the number of other subscribers to which the subscriber is linked or connected with respect to the given VAS. For example, a subscriber 201 belonging to a subscription account including three total subscribers 201 each subscribing to a given VAS may have a service depth 209 equal to three given that each subscriber 201 of the subscription account is linked by the same VAS. As another example, a subscriber 201 of a first subscription account may request a given VAS in collaboration with three other subscribers 201 belonging to three other subscription accounts. In this second example, the four subscribers 201 belonging to the four separate subscription accounts would each have a service depth 209 equal to four for the given VAS given that each would belong to a service group including four total subscribers 201. Thus, the service depth 209 for a given subscriber 201 with respect to a given VAS may be based on connections or linkages formed between subscribers 201 belonging to the same subscription account and/or linkages formed between subscribers 201 belonging to separate subscription accounts.

Figure 3:
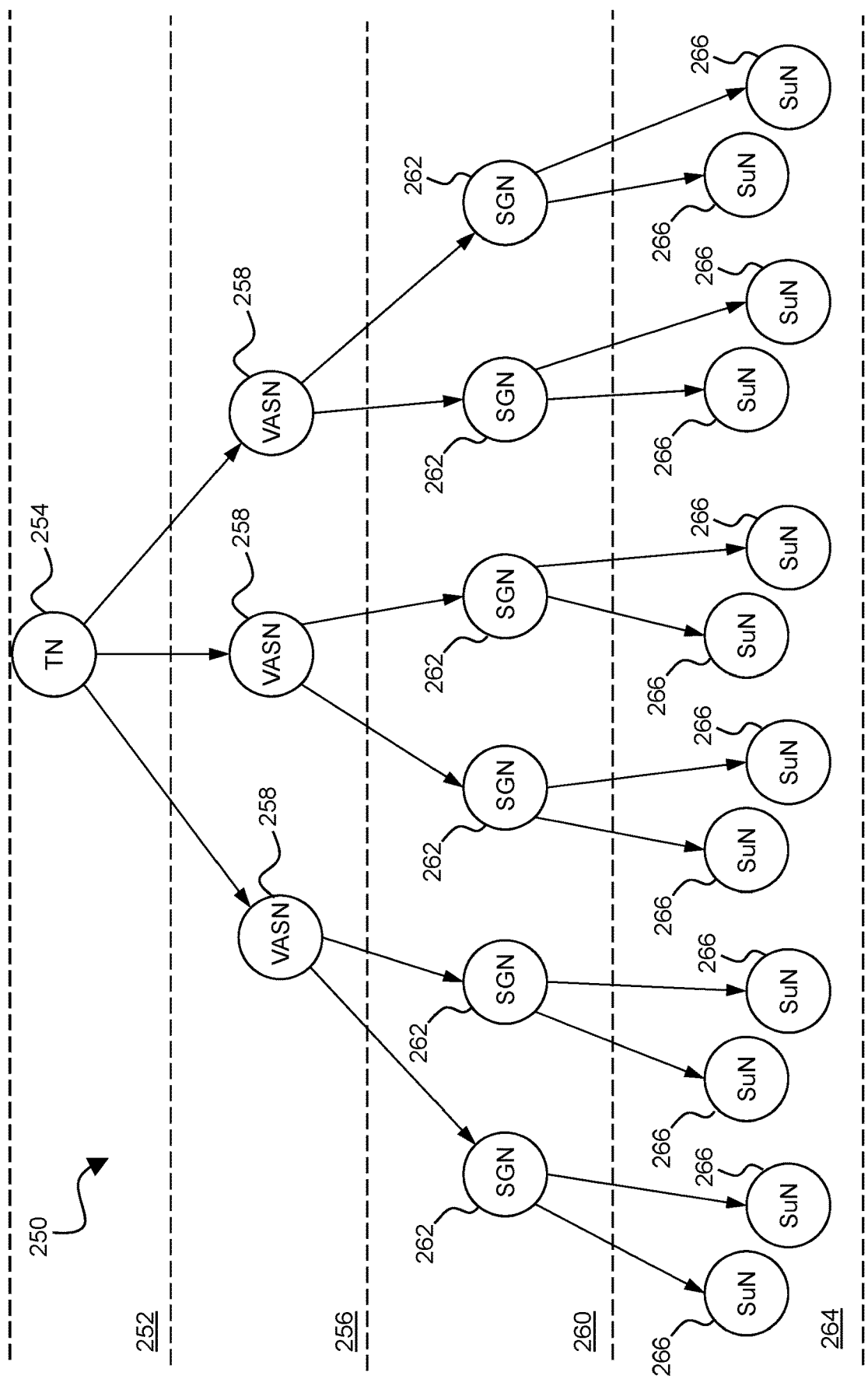
FIG. 3 is a graph of a subscriber relationship data structure according to an embodiment of the disclosure.

Subscriber relationship engine 208 may construct, manage, and maintain a data structure whereby the relationship of subscribers 201 having initiated a given VAS may be conveniently organized allowing for the convenient retrieval of the service depth 209 of a given subscriber 201 with respect to a particular VAS. Referring to FIGS. 1-3, in some embodiments, subscriber relationship engine 208 may construct and maintain a subscriber relationship data structure 250 as shown in FIG. 3 for organizing the information maintained by subscriber relationship engine 208. Utilizing a convenient data structure such as subscriber relationship data structure 250 for organizing the information maintained by subscriber relationship engine 208, information such as the service depth 209 of a given subscriber 201 with respect to a particular VAS may be readily determined and retrieved by the subscriber relationship engine 208. The subscriber relationship data structure 250 constructed and maintained by subscriber relationship engine 208 may be stored in a data store of network 132 such as data store 160.

The subscriber relationship data structure 250 constructed and maintained by subscriber relationship engine 208 may include a plurality of distinct layers or levels 252, 256, 260, and 264 to which different types or species of nodes are positioned. Particularly, subscriber relationship data structure 250 may include a first or upper layer 252 including an origin node 254 from which all other nodes of subscriber relationship data structure 250 are branched. Subscriber relationship data structure 250 includes a second or intermediate layer 256 beneath upper layer 252 and including one or more VAS nodes 258. Each VAS node 258 corresponds to a particular VAS provided by network 132 and included in the product catalog 202 of system 200. For example, each VAS node 258 is connected to the origin node 254 of upper layer 252 and may include a link to the VAS identified in the product catalog 202 corresponding to the given VAS node 258. Each VAS node 258 may also include a link to application instructions or other code deliverable to a subscriber's UE to allow the subscriber 201 to initiate the VAS corresponding to the VAS node 258.

Subscriber relationship data structure 250 may also include third or additional intermediate layer 260 including one or more service group nodes 262 each connected to one of the VAS nodes 258 of the intermediate layer 256. Each service group node 262 may include an identity of a service group as well as the number of subscribers 201 associated with the service group which corresponds to the service depth 209 of the given service group. Each service group corresponding to a given service group node 262 may comprise a plurality of subscribers 201 which have jointly requested the VAS corresponding to the VAS node 258 to which the given service group node 262 is connected. The subscribers 201 comprising a given service group corresponding to one of the service group nodes 262 may belong to a single subscription account and/or to a plurality of subscription accounts.

Subscriber relationship data structure 250 may further include a fourth or lower layer 264 including one or more subscriber nodes 266 each connected to one of the service group nodes 262 of intermediate layer 260. Each subscriber node 266 may link to the subscriber profile 205 of the subscriber 201 corresponding to the particular subscriber node 266. In this manner, subscriber relationship data structure 250 includes and/or links towards information pertaining to the VASs offered by network 132 at intermediate layer 256, of the service groups associated with each VAS offered by network 132 at intermediate layer 260, and to the subscribers 201 belonging to each service group at lower layer 264. In FIG. 3 subscriber relationship data structure 250 comprises a binary tree structure; however, in other embodiments, subscriber relationship engine 208 may construct and maintain other data structures for organizing information pertaining to the relationships of subscribers 201 and the VASs offered by network 132.

As shown particularly in FIG. 2, the offer estimator 210 of system 200 may estimate an offer to be provided to a subscriber 201 based on information provided by the pricing manager 212. Offer generator 214 of system 200 may generate an offer estimated by the offer estimator 210 where the generated offer may be presented (indicated by offer presenter 215 in FIG. 2) to a UE 203 of the subscriber 201 by the offer generator 214 of system 200. In some embodiments, offer estimator 210, pricing manger 212, and/or offer generator 214 may be components of the VAS managing engine 142 of VAS management server 140.

The offer generated by offer generator 214 may be based on the service depth 209 of the subscriber 201 with respect to the particular VAS requested by the subscriber 201. For example, a greater service depth 209 in which a relatively greater number of subscribers 201 belonging to separate subscription accounts jointly request the particular VAS may reduce the price of the VAS included within the offer generated to the subscriber 201 by the offer estimator 210. Conversely, a lesser service depth 209 in which a single or relatively small number of subscribers 201 jointly request the particular VAS may result in the price being relatively greater than the price in the earlier example. In other words, an increase in service depth 209 may result in a reduction in the price included in the offer provided by the offer estimator 210.

As described above, some VASs may deliver content created by third parties. The communication service provider associated with network 132 may negotiate a wholesale price at which the service provider may pay for the opportunity to offer the VAS directly to its subscribers 201. The wholesale price offered to the service provider of the VAS may be proportional to the amount of demand in terms of subscribers 201 and subscription accounts the service provider may drive to the particular VAS. Thus, by increasing the amount of demand for a given VAS among its subscriber base, the service provider may achieve a lower wholesale price for the given VAS which may then be passed to the subscribers 201. By correlating the price included in the offer generated by offer estimator 210 with the service depth 209 of the particular subscriber 201 with respect to the given VAS, subscribers 201 may be incentivized to maximize demand of the given VAS by referring other subscribers 201 previously unrelated to each other (e.g., belonging to separate subscription accounts) to jointly request the VAS. By allowing subscribers 201 belonging to separate subscription accounts to jointly request a particular VAS, system 200 provides greater flexibility and additional opportunities for the subscriber 201 to increase their service depth 209 with respect to the particular VAS, further maximizing demand for the particular VAS.

Figure 4:
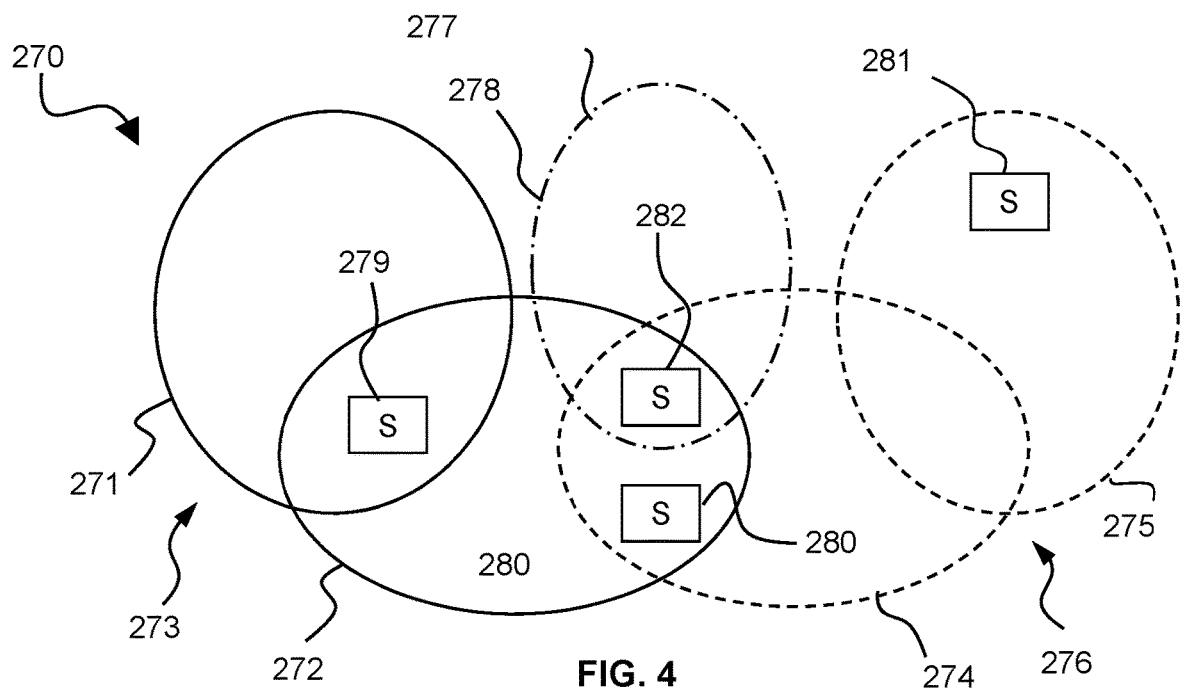
FIGS. 4 and 5 are Venn diagrams of exemplary relationships between subscribers and VASs offered by a network according to embodiments of the disclosure.
Figure 5:
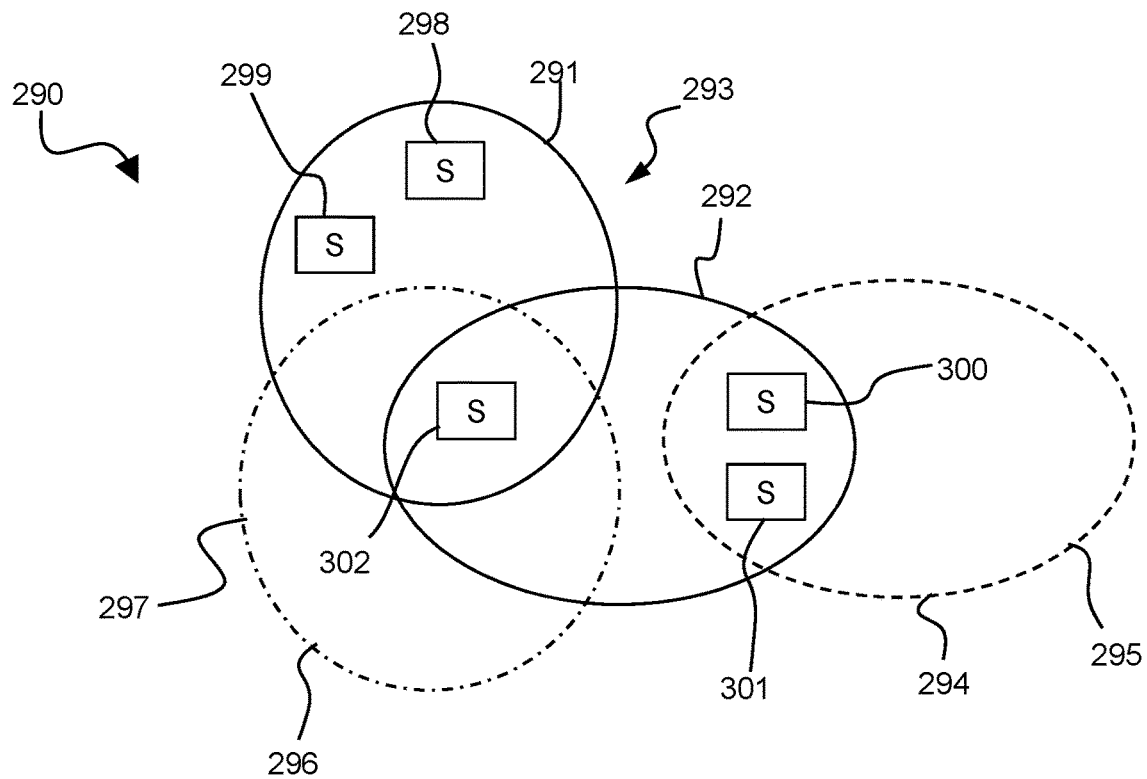

As described above, service groups associated with a particular VAS may include subscribers 201 belonging to a single subscription account or belonging to more than one subscription accounts. Referring to FIGS. 4, 5, Venn diagrams 270, 290 are shown, respectively, which illustrate a couple of examples of how service groups associated with different VASs may be constructed. It may be understood that the number of subscription accounts, associated subscribers, and VASs to which each subscriber has initiated may vary substantially from the examples provided by Venn diagrams 270, 290.

In the example of Venn diagram 270 shown in FIG. 4, subscribers 271, 272 of a communication service provider belong to a subscription account 273, subscribers 274, 275 of the service provider belong to a subscription account 276 that is different from subscription account 273, and a subscriber 277 of the service provider belongs to a subscription account 278 which is different from subscription accounts 273, 276. In this example, each subscriber 271, 272 of subscription account 273 may each jointly request a VAS 279 thereby forming a first service group comprising subscribers 271, 272 having a service depth equal to two associated with VAS 279. A first offer may be presented to subscribers 271, 272 by the offer presenter 215 shown in FIG. 2. The first offer presented to subscribers 271, 272 may be generated by the offer generator 214 shown in FIG. 2 and may be based on the service depth of two for the first service group.

Additionally, in the example of Venn diagram 270, subscriber 272 of subscription account 273 and subscriber 274 of subscription account 276 may each jointly request a VAS 280 thereby forming a second service group comprising subscribers 272, 274 having a service depth equal to two and associated with VAS 280. A second offer may be jointly presented to subscribers 272, 274 by the offer presenter 215 shown in FIG. 2. The second offer presented to subscribers 272, 274 may be generated by the offer generator 214 shown in FIG. 2 and may be based on the service depth of two for the second service group comprising. The second offer presented to subscribers 272, 274 with respect to the second service group may be associated with both the subscription account 273 and subscription account 276. Thus, should subscribers 272, 274 jointly accept the second offer (the second offer cannot be validly accepted by only one of the subscribers 272, 274), each subscription account 273, 276 will be responsible for abiding by the terms and conditions of the second offer.

Additionally, in the example of Venn diagram 270, subscriber 275 of subscription account 276 may request a VAS 281 thereby forming a third service group comprising only subscriber 275 and thus having a service depth equal to one with respect to VAS 281. A third offer may be presented to subscriber 275 by the offer presenter 215 shown in FIG. 2. The third offer presented to subscriber 275 may be generated by the offer generator 214 shown in FIG. 2 and may be based on the service depth of one for the third service group. The third offer presented to subscriber 275 with respect to VAS 281 is associated with subscription account 276 and thus account 276 will be responsible for abiding by the terms and conditions of the third offer should it be accepted by subscriber 275.

Further, in the example of Venn diagram 270, subscriber 272 of subscription account 273, subscriber 274 of subscription account 276, and subscriber 277 of subscription account 278 may each jointly request a VAS 282 thereby forming a fourth service group comprising subscribers 272, 274, and 277 having a service depth equal to three with respect to VAS 282. A fourth offer may be jointly presented to subscribers 272, 274, and 277 by the offer presenter 215 shown in FIG. 2. The fourth offer presented to subscribers 272, 274, and 277 may be generated by the offer generator 214 shown in FIG. 2 and may be based on the service depth of two for the fourth service group. The fourth offer presented to subscribers 272, 274, and 277 with respect to the fourth service group may be associated with each of the subscription account 273, the subscription account 276, and the subscription account 278. Thus, should subscribers 272, 274, and 277 jointly accept the fourth offer (the offer can only be accepted jointly by subscribers 272, 274, and 277), each subscription account 273, 276, and 278 will be responsible for abiding by the terms and conditions of the fourth offer.

In the example of Venn diagram 290 shown in FIG. 5, subscribers 291, 292 of a communication service provider belong to a subscription account 293, a subscriber 294 of service provider belongs to a subscription account 295 that is different from subscription account 293, and a subscriber 296 of service provider belongs to a subscription account 297 which is different from subscription accounts 293, 295. In this example, subscriber 291 of subscription account 293 may request both a VAS 298 and a VAS 299 thereby forming a first service group (corresponding to VAS 298) and a second service group (corresponding to VAS 299) each comprising only subscriber 291 and thus having a service depth equal to one associated with VAS 298 (the first service group) and VAS 299 (the second service group). A first offer of VAS 298 and a second offer for VAS 299 may be provided to subscriber 291 by the offer presenter 215 shown in FIG. 2. The first and second offers may be generated by the offer generator 214 shown in FIG. 2 and may be based on the service depth of one for the first and second service groups. The first and second offers provided to subscriber 291 with respect to VAS 298 and VAS 298, respectively, are associated with subscription account 293 and thus account 293 will be responsible for abiding by the terms and conditions of the first and second offers should they be accepted by subscriber 291.

Additionally, in the example of Venn diagram 290, subscriber 292 of subscription account 293 and subscriber 294 of subscription account 295 may each jointly request a VAS 300 thereby forming a third service group comprising subscribers 292, 295 associated with VAS 300 and having a service depth equal to two. Subscribers 292, 294 may each additionally jointly request a VAS 301 thereby forming a fourth service group comprising subscribers 292, 295 associated with VAS 301 and having a service depth also equal to two. Third and fourth offers may be presented to subscribers 292, 294 by the offer presenter 215 shown in FIG. 2. The third and fourth offers presented to subscribers 292, 294 may be generated by the offer generator 214 shown in FIG. 2 and may be based on the service depth of two for the third and fourth service groups, respectively. The third and fourth offers presented to subscribers 292, 294 with respect to the third and fourth services groups may be associated with both the subscription account 293 and subscription account 295. Thus, should subscribers 292, 294 jointly accept the third and/or fourth offers (the third and fourth offers cannot be validly accepted by only one of the subscribers 292, 294), each subscription account 293, 295 will be responsible for abiding by the terms and conditions of the accepted third and/or fourth offers.

Further, in the example of Venn diagram 290, subscribers 291, 292 of subscription account 293 and subscriber 276 of subscription account 277 may each jointly request a VAS 302 thereby forming a fifth service group comprising subscribers 291, 292, and 296 having a service depth equal to three that is associated with VAS 302. A fifth offer may be jointly presented to subscribers 291, 292, and 296 by the offer presenter 215 shown in FIG. 2. The second offer presented to subscribers 291, 292, and 296 may be generated by the offer generator 214 shown in FIG. 2 and may be based on the service depth of three for the fifth service group. The fifth offer presented to subscribers 291, 292, and 296 with respect to the fifth service group may be associated with both the subscription account 93 and subscription account 297. Thus, should subscribers 291, 292, and 296 jointly accept the fifth offer (the fifth offer must be accepted jointly by subscribers 291, 292, and 296), each subscription account 293, 297 will be responsible for abiding by the terms and conditions of the fifth offer.

Referring again to FIGS. 1, 2, as described above, offer generator 214 of system 200 may present an offer estimated by offer estimator 210 with respect to a VAS to subscriber 201. In some embodiments, the offer generator 214 may transmit the offer across the network 132 to the UE 203 of subscriber 201. In other embodiments subscriber 201 may be notified of the offer generated by offer generator 214 via other mechanisms such as via an Email delivered to an Email address associated with the subscriber 201. The identity of the subscriber 201's UE 203 may be determined from the subscriber profile index 205. The offer presented to the subscriber 201 may be based on the service depth 209 of a service group comprising the subscriber. Upon receiving the offer, the subscriber 201 may accept or reject the offer using the UE 203. If each subscriber 201 belonging to the service group of subscribers 201 which jointly requested the VAS accepts the offer, the service provider which manages network 132 may initiate the VAS on the UE's 203 associated with the subscribers 201 comprising the service group.

Particularly, the VAS provisioning engine 152 of the provisioning server 150 may access application instructions or other code corresponding to the VAS requested by the service group and deploy or transmit the application instructions across the network 132 and to the UEs 203 associated with the subscribers 201 comprising the service group. The VAS may then be installed on the UEs 203 associated with the subscribers 201 comprising the service group and the service provider may henceforth authorize the UEs 203 associated with the subscribers 201 comprising the service group to utilize the functionalities of network 132 in order to access and utilize the VAS.

In some embodiments, subscribers 201 may request various VASs included in product catalog 202 at any point in time at or following the initiation of the subscription account to which the subscriber 201 belongs, permitting the subscriber 201 to dynamically add VASs as the needs and desires of the subscriber 201 change over time. This is in contrast to conventional systems in which a subscriber may not add VASs once initiating a subscription account which is provided with a fixed number and identity of VASs. In some embodiments, the subscriber 201 may also, at any time following the initiation of the subscription account to which the subscriber 201 belongs, delete or remove any unwanted VASs which will no longer be billed to the subscription account following removal. Also, in contrast to conventional systems, the subscriber 201 may jointly request access to one or more VASs with one or more subscribers 201 that also belong to the same subscription account to which the subscriber 201 belongs and/or to other, separate subscription accounts.

Figure 6:
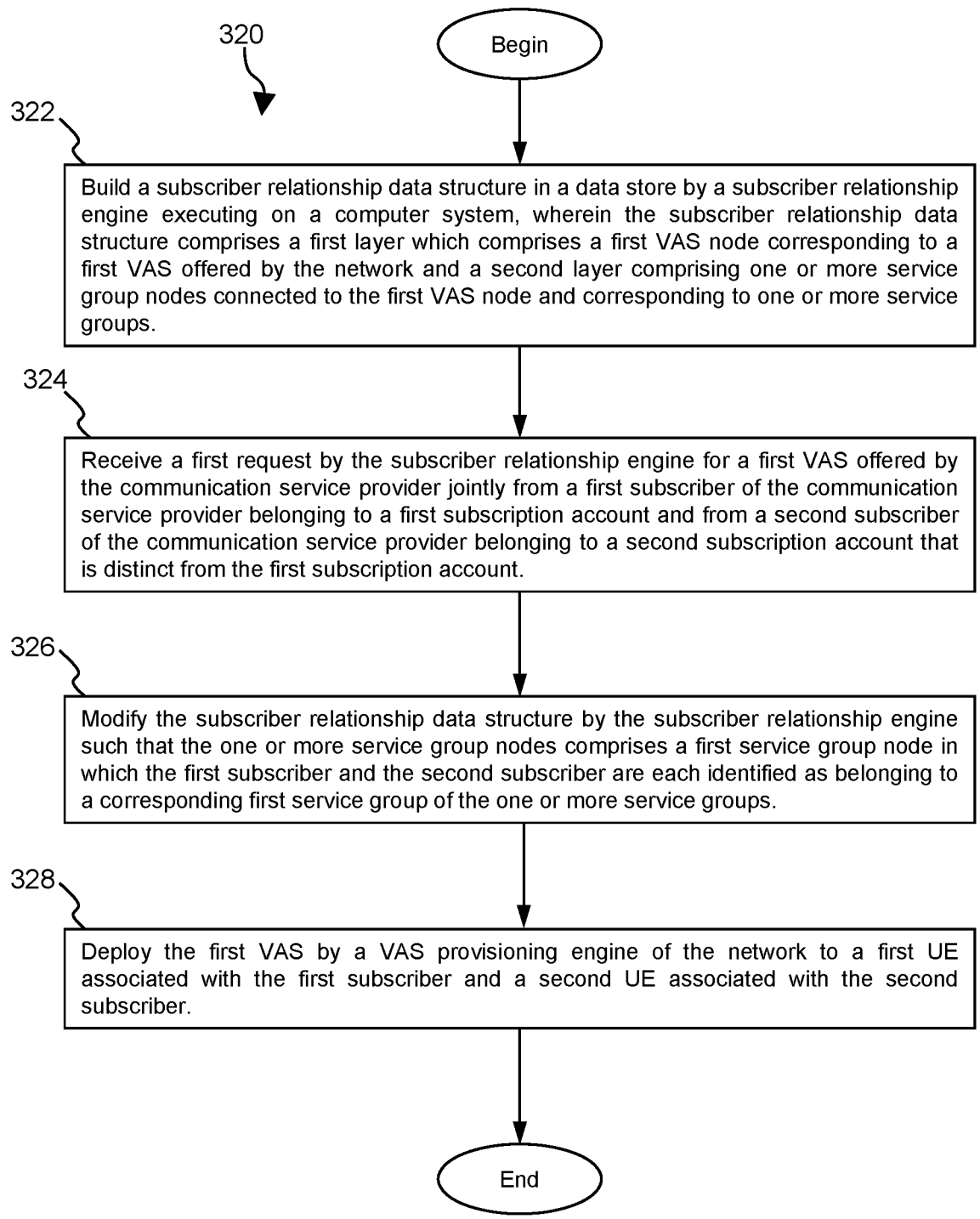
FIG. 6 is a flow chart of a method according to an embodiment of the disclosure.

Turning to FIG. 6, a method 320 is described. In an embodiment, the method 320 is a method for providing communication services as VASs to subscribers of a communication service provider (e.g., the service provider which manages network 132 shown in FIG. 1) based on building a subscriber relationship data structure (e.g., subscriber relationship data structure 250 shown in FIG. 3) in a data store (e.g., data store 160 shown in FIG. 1) and referencing the data store to determine service groups of subscribers to deploy the VASs. At block 322, the method 320 comprises building the subscriber relationship data structure in the data store by a subscriber relationship engine (e.g., subscriber relationship engine 208 shown in FIG. 2) executing on a computer system, wherein the subscriber relationship data structure comprises a first layer which comprises a first VAS node corresponding to a first VAS offered by the network and a second layer comprising one or more service group nodes connected to the first VAS node and corresponding to one or more service groups.

At block 324, the method 320 comprises receiving a first request by the subscriber relationship engine for a first VAS offered by the communication service provider jointly from a first subscriber of the communication service provider belonging to a first subscription account (e.g., first subscription account 105 shown in FIG. 1) and from a second subscriber of the communication service provider belonging to a second subscription account (e.g., second subscription account 125) that is distinct from the first subscription account.

At block 326, method 320 comprises modifying the subscriber relationship data structure by the subscriber relationship engine such that the one or more service group nodes comprises a first service group node in which the first subscriber and the second subscriber are each identified as belonging to a corresponding first service group of the one or more service groups. At block 328, method 320 comprises deploying the first VAS by a VAS provisioning engine (e.g., VAS provisioning engine 152 shown in FIG. 1) executing on the computer system to a first UE (e.g., first UE 102) associated with the first subscriber and a second UE (e.g., third UE 120) associated with the second subscriber.

Figure 7A:
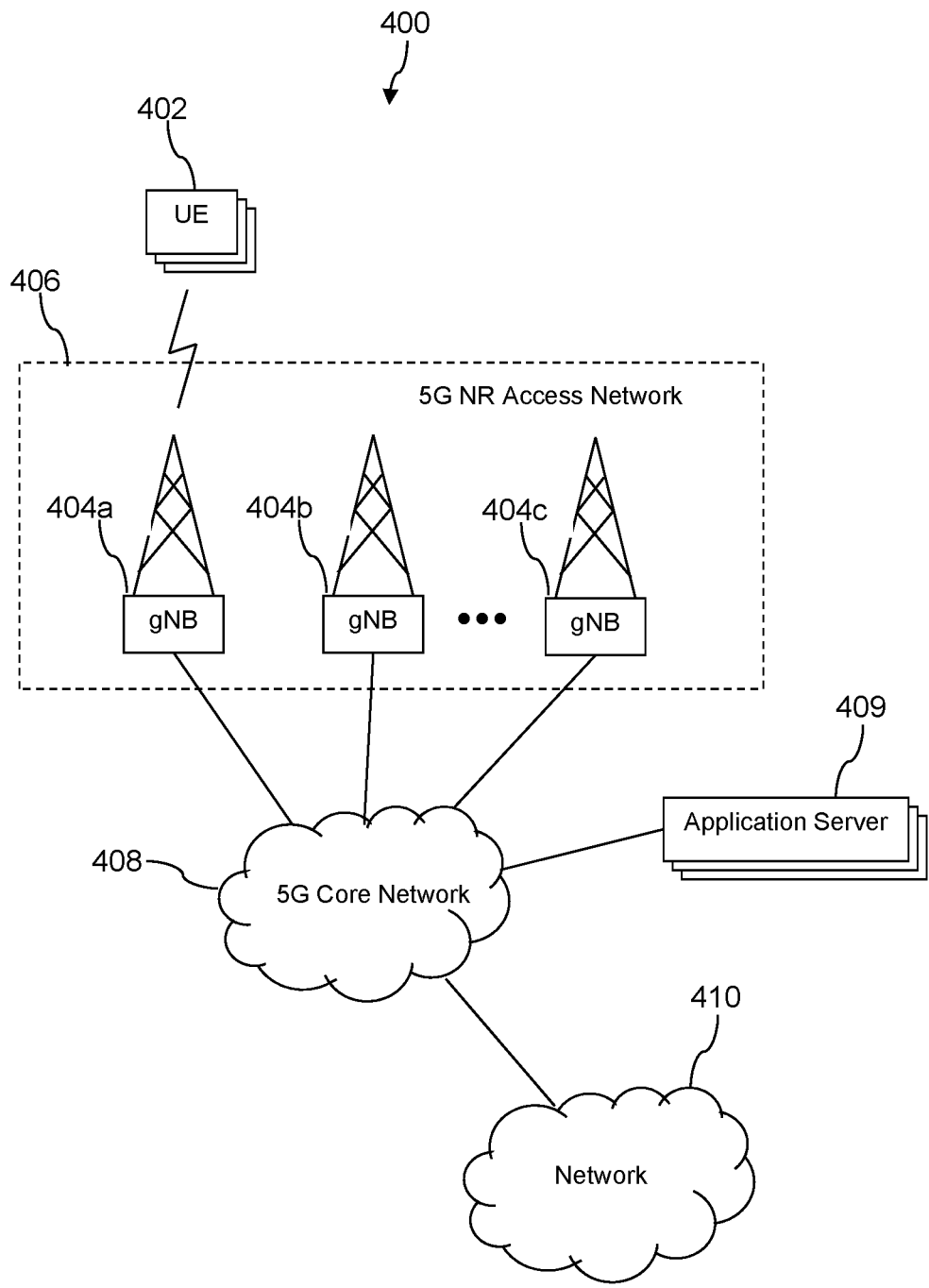
FIG. 7A is a block diagram of another communication system according to an embodiment of the disclosure.

Turning now to FIG. 7A, an exemplary communication system 400 is described. At least some of the components of communication system 100 (e.g., one or more of UEs 102, 110, 120, access node 130, network 132, etc.) shown in FIG. 1 may be implemented in accordance and in a matter consistent with the teachings of communication system 400 shown in FIG. 7A. Typically, the communication system 400 includes a number of access nodes 404 that are configured to provide coverage in which UEs 402 such as cell phones, tablet computers, machine-type-communication devices, tracking devices, embedded wireless modules, and/or other wirelessly equipped communication devices (whether or not user operated), can operate. In some embodiments, access node 130 of the communication system 100 shown in FIG. 1 may be configured similarly as access nodes 404 of communication system 400. Additionally, in some embodiments, one or more of UEs 102, 110, AND 120 of the communication system 100 shown in FIG. 1 may be configured similarly as UEs 402. The access nodes 404 may be said to establish an access network 406. The access network 406 may be referred to as a radio access network (RAN) in some contexts. In a 5G technology generation an access node 404 may be referred to as a gigabit Node B (gNB). In 4G technology (e.g., long term evolution (LTE) technology) an access node 404 may be referred to as an enhanced Node B (eNB). In 3G technology (e.g., code division multiple access (CDMA) and global system for mobile communication (GSM)) an access node 404 may be referred to as a base transceiver station (BTS) combined with a basic station controller (BSC). In some contexts, the access node 404 may be referred to as a cell site or a cell tower. In some implementations, a picocell may provide some of the functionality of an access node 404, albeit with a constrained coverage area. Each of these different embodiments of an access node 404 may be considered to provide roughly similar functions in the different technology generations.

In an embodiment, the access network 406 comprises a first access node 404a, a second access node 404b, and a third access node 404c. It is understood that the access network 406 may include any number of access nodes 404. Further, each access node 404 could be coupled with a core network 408 that provides connectivity with various application servers 409 and/or a network 410. In some embodiments, network 106 of the communication system 100 shown in FIG. 1 may be configured similarly as core network 408. In an embodiment, at least some of the application servers 409 may be located close to the network edge (e.g., geographically close to the UE 402 and the end user) to deliver so-called "edge computing." The network 410 may be one or more private networks, one or more public networks, or a combination thereof. The network 410 may comprise the public switched telephone network (PSTN). The network 410 may comprise the Internet. With this arrangement, a UE 402 within coverage of the access network 406 could engage in air-interface communication with an access node 404 and could thereby communicate via the access node 404 with various application servers and other entities.

The communication system 400 could operate in accordance with a particular radio access technology (RAT), with communications from an access node 404 to UEs 402 defining a downlink or forward link and communications from the UEs 402 to the access node 404 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 404 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 404 could define an air interface configured in a specific manner to define physical resources for carrying information wirelessly between the access node 404 and UEs 402.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 402.

In addition, certain resource elements on the example air interface could be reserved for special purposes. For instance, on the downlink, certain resource elements could be reserved to carry synchronization signals that UEs 402 could detect as an indication of the presence of coverage and to establish frame timing, other resource elements could be reserved to carry a reference signal that UEs 402 could measure in order to determine coverage strength, and still other resource elements could be reserved to carry other control signaling such as PRB-scheduling directives and acknowledgement messaging from the access node 404 to served UEs 402. And on the uplink, certain resource elements could be reserved to carry random access signaling from UEs 402 to the access node 404, and other resource elements could be reserved to carry other control signaling such as PRB-scheduling requests and acknowledgement signaling from UEs 402 to the access node 404

The access node 404, in some instances, may be split functionally into a radio unit (RU), a distributed unit (DU), and a central unit (CU) where each of the RU, DU, and CU have distinctive roles to play in the access network 406. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
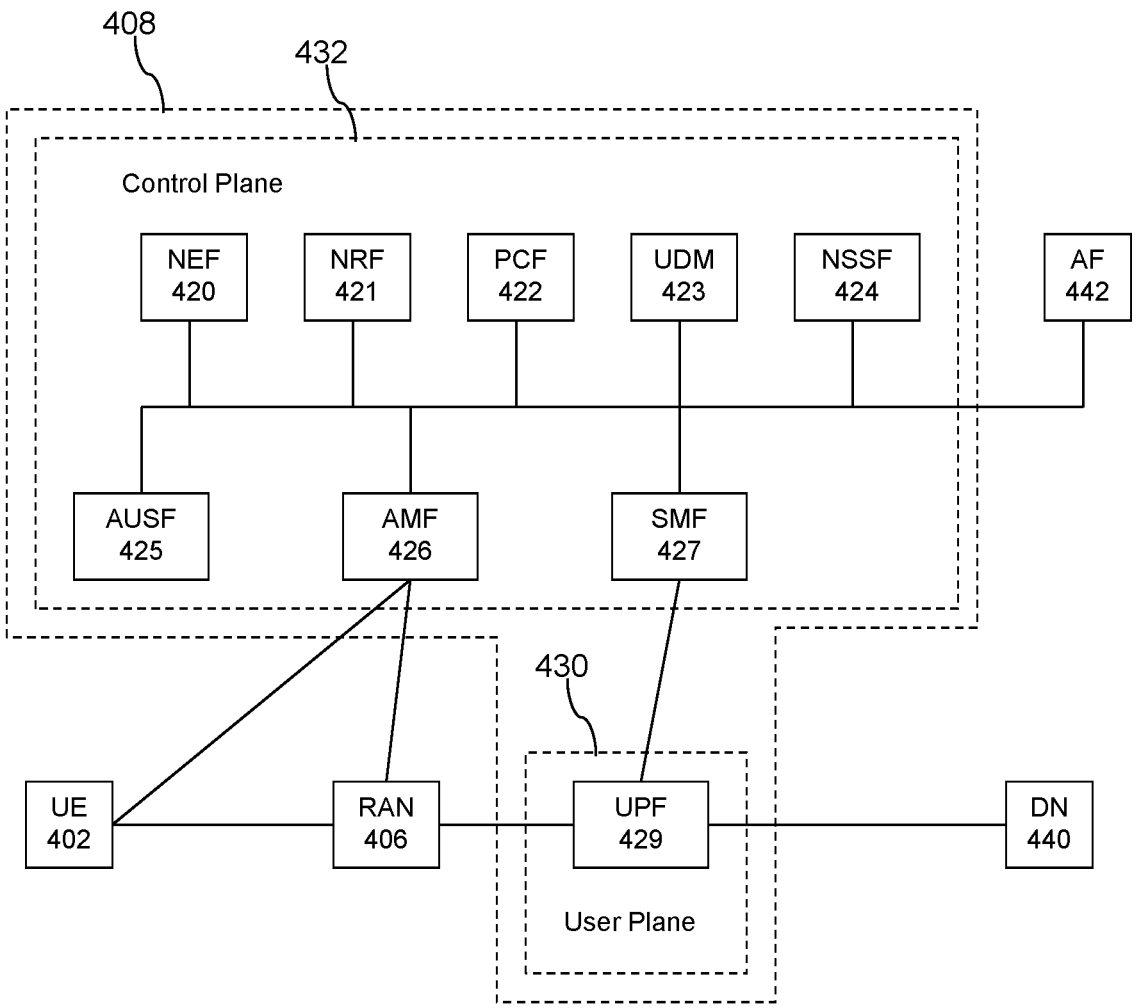
FIG. 7B is a block diagram of a core network of the communication system of FIG. 7A according to an embodiment of the disclosure.

Turning now to FIG. 7B, further details of the core network 408 are described. In an embodiment, the core network 408 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 429, an authentication server function (AUSF) 425, an access and mobility management function (AMF) 426, a session management function (SMF) 427, a network exposure function (NEF) 420, a network repository function (NRF) 421, a policy control function (PCF) 422, a unified data management (UDM) 423, a network slice selection function (NSSF) 424, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 408 may be segregated into a user plane 430 and a control plane 432, thereby promoting independent scalability, evolution, and flexible deployment.

The UPF 429 delivers packet processing and links the UE 402, via the access node 406, to a data network 440 (e.g., the network 410 illustrated in FIG. 7A). The AMF 426 handles registration and connection management of non-access stratum (NAS) signaling with the UE 402. Said in other words, the AMF 426 manages UE registration and mobility issues. The AMF 426 manages reachability of the UEs 402 as well as various security issues. The SMF 427 handles session management issues. Specifically, the SMF 427 creates, updates, and removes (destroys) protocol data unit (PDU) sessions and manages the session context within the UPF 429. The SMF 427 decouples other control plane functions from user plane functions by performing dynamic host configuration protocol (DHCP) functions and IP address management functions. The AUSF 425 facilitates security processes.

The NEF 420 securely exposes the services and capabilities provided by network functions. The NRF 421 supports service registration by network functions and discovery of network functions by other network functions. The PCF 422 supports policy control decisions and flow based charging control. The UDM 423 manages network user data and can be paired with a user data repository (UDR) that stores user data such as customer profile information, customer authentication number, and encryption keys for the information. An application function 442, which may be located outside of the core network 408, exposes the application layer for interacting with the core network 408. In an embodiment, the application function 442 may be execute on an application server 409 located geographically proximate to the UE 402 in an "edge computing" deployment mode. The core network 408 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 424 can help the AMF 426 to select the network slice instance (NSI) for use with the UE 402.

Figure 8:
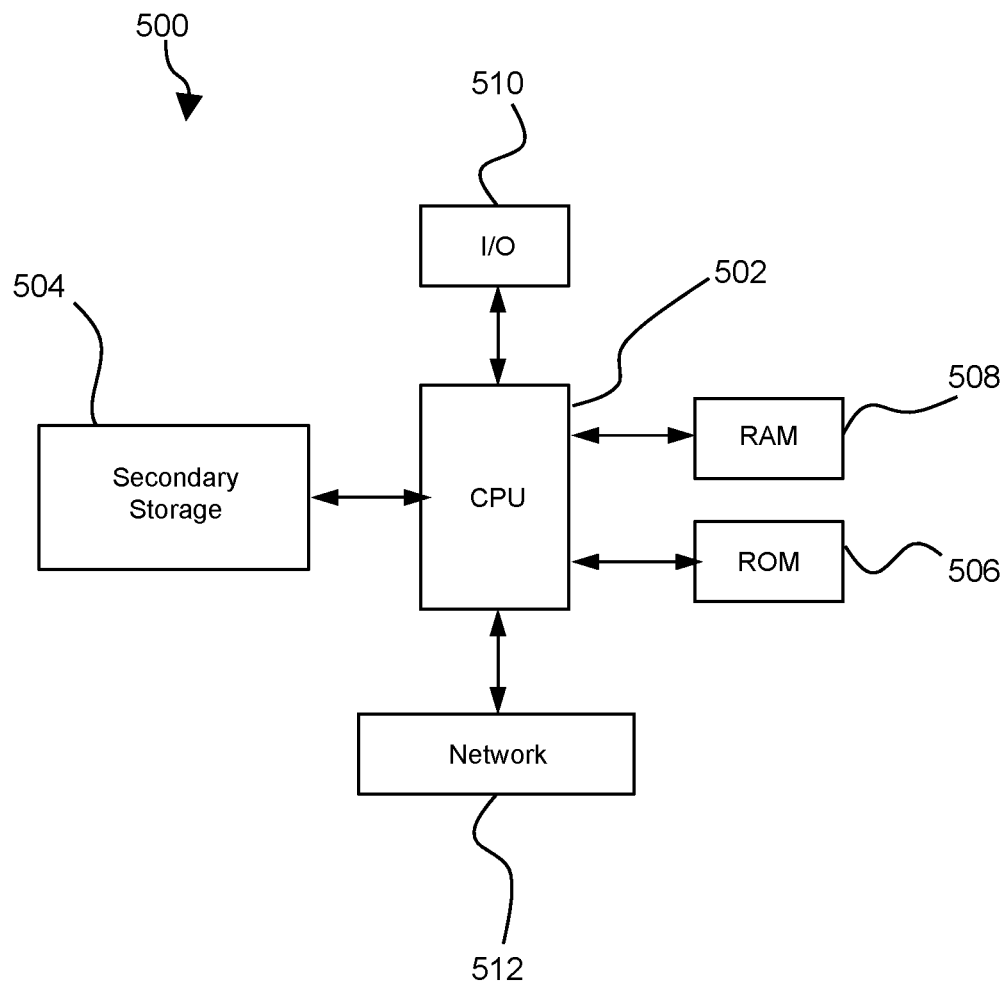
FIG. 8 is a block diagram of a computer system according to an embodiment of the disclosure.

FIG. 8 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for providing communication services as value added services (VASs) to subscribers of a communication service provider based on building a subscriber relationship data structure in a data store and referencing the data store to determine service groups of subscribers to deploy the VASs, comprising:
   a processor;
   a non-transitory memory; and
   one or more applications stored in the non-transitory memory that, when executed by the processor:
   build the subscriber relationship data structure in the data store by a subscriber relationship engine of a network managed by the communication service provider, wherein the subscriber relationship engine comprises one of the one or more applications executable by the processor and the subscriber relationship data structure comprises a first layer which comprises a first VAS node corresponding to a first VAS offered by the network and a second layer comprising one or more service group nodes connected to the first VAS node and corresponding to one or more service groups; and
   receive a first request by the subscriber relationship engine for the first VAS offered by the communication service provider jointly from a first subscriber of the communication service provider belonging to a first subscription account and from a second subscriber of the communication service provider belonging to a second subscription account that is distinct from the first subscription account, the first subscription account is associated with a first family unit, and the second subscription account is associated with a second family unit;
   modify the subscriber relationship data structure by the subscriber relationship engine such that the one or more service group nodes comprises a first service group node in which the first subscriber and the second subscriber are each identified as belonging to a corresponding first service group of the one or more service groups; and
   deploy, based on the subscriber relationship data structure, the first VAS by a VAS provisioning engine of the network to a first user equipment (UE) associated with the first subscriber and a second UE associated with the second subscriber.

2. The system of claim 1, wherein the one or more applications stored in the non-transitory memory that, when executed by the processor:
   receive a second request by the subscriber relationship engine of the network for a second VAS offered by the communication service provider from a third subscriber of the communication service provider belonging to a third subscription account to which a fourth subscriber of the communication service provider jointly belongs;

modify the subscriber relationship data structure by the subscriber relationship engine such that the one or more service group nodes comprises a second service group node in which the third subscriber and the fourth subscriber are each identified as belonging to a corresponding second service group of the one or more service groups; and deploy the second VAS by the VAS provisioning engine of the network to a third UE associated with the third subscriber but not to any UE associated with the fourth subscriber.

3. The system of claim 1, wherein the one or more applications stored in the non-transitory memory that, when executed by the processor:

receive a second request by the subscriber relationship engine of the network for a second VAS offered by the communication service provider jointly from a third subscriber of the communication service provider belonging to a third subscription account and from a fourth subscriber of the communication service provider belonging to a fourth subscription account to which a fifth subscriber of the communication service provider jointly belongs, wherein the fourth subscription account is distinct from the third subscription account;

modify the subscriber relationship data structure by the subscriber relationship engine such that the one or more service group nodes comprises a second service group node in which the third subscriber and the fourth subscriber are each identified as belonging to a corresponding second service group of the one or more service groups; and deploy the second VAS by the VAS provisioning engine of the network to a third UE associated with the third subscriber and to a fourth UE associated with the fourth subscriber but not to any UE associated with the fifth subscriber.

4. The system of claim 1, wherein the one or more applications stored in the non-transitory memory that, when executed by the processor:

present a first offer for the first VAS by an offer presenter of the network jointly to the first subscriber and the second subscriber in response to receiving the first request.

5. The system of claim 4, wherein the first offer is based on a service depth corresponding to the total number of subscribers comprising the first service group associated with the VAS.

6. The system of claim 1, wherein the subscriber relationship data structure comprises a third layer comprising a plurality of subscriber nodes connected to the first service group node, and wherein the plurality of subscriber nodes correspond to the first subscriber and the second subscriber.

7. The system of claim 1, wherein the one or more applications stored in the non-transitory memory that, when executed by the processor:

transmit application instructions associated with the first VAS from the network by the VAS provisioning engine to the first UE and the second UE to deploy the first VAS to the first subscriber and the second subscriber.

8. A system for providing communication services as value added services (VASs) to subscribers of a communication service provider based on building a subscriber relationship data structure in a data store and referencing the data store to determine service groups of subscribers to deploy the VASs, comprising:

a processor;

a non-transitory memory; and one or more applications stored in the non-transitory memory that, when executed by the processor:

construct the subscriber relationship data structure in the data store by a subscriber relationship engine of a network managed by the communication service provider and comprising a first layer, wherein the subscriber relationship engine comprises one of the one or more applications executable by the processor and the relationship data structure comprises a first layer which comprises a first VAS node corresponding to a first VAS offered by the network and a second layer comprising one or more service group nodes connected to the first VAS node and corresponding to one or more service groups;

receive a first request by the subscriber relationship engine for a first VAS offered by the communication service provider jointly from a first subscriber of the communication service provider and from a second subscriber of the communication service provider, wherein the first subscriber is associated with a first family unit, and the second subscriber is associated with a second family unit;

modify the subscriber relationship data structure by the subscriber relationship engine such that the one or more service group nodes comprises a first service group node in which the first subscriber and the second subscriber are each identified as belonging to a corresponding first service group of the one or more service groups;

present a first offer for the first VAS by an offer presenter of the network to the first subscriber and the second subscriber in response to receiving the first request, wherein the first offer is based on a service depth corresponding to the total number of subscribers comprising the first service group associated with the VAS; and deploy the VAS by a VAS provisioning engine of the network to a first user equipment (UE) associated with the first subscriber and a second UE associated with the second subscriber in response to both the first subscriber and the second subscriber jointly accepting the first offer presented by the offer presenter.

9. The system of claim 8, wherein the one or more applications stored in the non-transitory memory that, when executed by the processor:

adjust the service depth of the first service group in response to a third subscriber of the network being added to the first service group of the subscriber relationship data structure by the subscriber relationship engine.

10. The system of claim 8, wherein the subscriber relationship data structure comprises a third layer comprising a plurality of subscriber nodes connected to the first service group node, and wherein the plurality of subscriber nodes correspond to the first subscriber and the second subscriber.

11. The system of claim 10, wherein a first subscriber node of the plurality of subscriber nodes comprises a link to a subscriber profile corresponding to the first subscriber stored in a datastore of the network.

12. The system of claim 8, wherein:

the first layer of the subscriber relationship data structure comprises a plurality of VAS nodes, including the first VAS node, corresponding to a plurality of VASs offered by the communication service provider, including the first VAS, separately offered by the communication service provider; and wherein the second layer of the subscriber relationship data structure comprises a plurality of service group nodes, including the first service group node.

13. The system of claim 8, wherein the first subscriber belongs to a first subscription account and the second subscriber belongs to a second subscription account that is distinct from the first subscription account.

14. The system of claim 13, wherein the one or more applications stored in the non-transitory memory that, when executed by the processor:

receive a second request by the subscriber relationship engine of the network for a second VAS offered by the communication service provider from a third subscriber of the communication service provider belonging to a third subscription account to which a fourth subscriber of the communication service provider jointly belongs;

modify the subscriber relationship data structure by the subscriber relationship engine such that the one or more service group nodes comprises a second service group node in which the third subscriber and the fourth subscriber are each identified as belonging to a corresponding second service group of the one or more service groups;

present a second offer for the second VAS by the offer presenter of the network to the third subscriber; and deploy the second VAS by the VAS provisioning engine of the network to a third UE associated with the third subscriber but not to any UE associated with the fourth subscriber in response to third subscriber accepting the second offer presented by the offer presenter.

15. A method for providing communication services as value added services (VASs) to subscribers of a communication service provider based on building a subscriber relationship data structure in a data store and referencing the data store to determine service groups of subscribers to deploy the VASs, comprising:

(a) building the subscriber relationship data structure in the data store by a subscriber relationship engine executing on a computer system, wherein the subscriber relationship data structure comprises a first layer which comprises a first VAS node corresponding to a first VAS offered by the network and a second layer comprising one or more service group nodes connected to the first VAS node and corresponding to one or more service groups;

(b) receiving a first request by the subscriber relationship engine for a first VAS offered by the communication service provider jointly from a first subscriber of the communication service provider belonging to a first subscription account and from a second subscriber of the communication service provider belonging to a second subscription account that is distinct from the first subscription account, the first subscription account is associated with a first family unit, and the second subscription account is associated with a second family unit;

(c) modifying the subscriber relationship data structure by the subscriber relationship engine such that the one or more service group nodes comprises a first service group node in which the first subscriber and the second subscriber are each identified as belonging to a corresponding first service group of the one or more service groups; and (d) deploying the first VAS by a VAS provisioning engine executing on the computer system to a first user equipment (UE) associated with the first subscriber and a second UE associated with the second subscriber.

16. The method of 15, further comprising:

(e) receiving a second request by the subscriber relationship engine for a second VAS offered by the communication service provider from a third subscriber of the communication service provider belonging to a third subscription account to which a fourth subscriber of the communication service provider jointly belongs; and (f) modifying the subscriber relationship data structure by the subscriber relationship engine such that the one or more service group nodes comprises a second service group node in which the third subscriber and the fourth subscriber are each identified as belonging to a corresponding second service group of the one or more service groups; and (g) deploying the second VAS by the VAS provisioning engine to a third UE associated with the third subscriber but not to any UE associated with the fourth subscriber.

17. The method of 15, further comprising:

(e) receiving a second request by the subscriber relationship engine for a second VAS offered by the communication service provider jointly from a third subscriber of the communication service provider belonging to a third subscription account and from a fourth subscriber of the communication service provider belonging to a fourth subscription account to which a fifth subscriber of the communication service provider jointly belongs, wherein the fourth subscription account is distinct from the third subscription account;

(f) modifying the subscriber relationship data structure by the subscriber relationship engine such that the one or more service group nodes comprises a second service group node in which the third subscriber and the fourth subscriber are each identified as belonging to a corresponding second service group of the one or more service groups; and (g) deploying the second VAS by the VAS provisioning engine to a third UE associated with the third subscriber and to a fourth UE associated with the fourth subscriber but not to any UE associated with the fifth subscriber.

18. The method of 15, further comprising:

(d) presenting a first offer for the first VAS by an offer presenter executing on the computer system jointly to the first subscriber and the second subscriber in response to receiving the first request from the first subscriber and the second subscriber for the first VAS, wherein the first offer is based on a service depth corresponding to the total number of subscribers comprising the first service group associated with the VAS.

19. The method of 18, further comprising:

(e) adjusting the service depth of the first service group by the subscriber relationship engine in response to a third subscriber of the network being added to the first service group of the subscriber relationship data structure by the subscriber relationship engine.

20. The method of 15, wherein the subscriber relationship data structure comprises a third layer comprising a plurality of subscriber nodes connected to the first service group node, and wherein the plurality of subscriber nodes correspond to the first subscriber and the second subscriber.

* * * * *